United States Patent
Blank et al.

(10) Patent No.: US 9,033,835 B2
(45) Date of Patent: May 19, 2015

(54) SPROCKET

(75) Inventors: Stefan Blank, Waging a. See (DE); Thomas Bauer, Wonneberg (DE)

(73) Assignee: MXC GMBH, Waging a. See (DE)

( * ) Notice: Subject to any disclaimer, the term of this patent is extended or adjusted under 35 U.S.C. 154(b) by 261 days.

(21) Appl. No.: 13/702,695

(22) PCT Filed: Jun. 15, 2011

(86) PCT No.: PCT/EP2011/002951
§ 371 (c)(1), (2), (4) Date: Feb. 19, 2013

(87) PCT Pub. No.: WO2011/157415
PCT Pub. Date: Dec. 22, 2011

(65) Prior Publication Data
US 2013/0143704 A1 Jun. 6, 2013

(30) Foreign Application Priority Data

Jun. 15, 2010 (DE) .......................... 10 2010 023 881
Jun. 15, 2010 (DE) .......................... 10 2010 023 882

(51) Int. Cl.
*F16H 55/30* (2006.01)
*B62M 9/10* (2006.01)
*F16H 55/12* (2006.01)

(52) U.S. Cl.
CPC ................ *F16H 55/30* (2013.01); *B62M 9/10* (2013.01); *F16H 55/12* (2013.01)

(58) Field of Classification Search
CPC . F16H 55/30; F16H 55/171; F16H 2055/306; F16H 7/023

USPC .......................................................... 474/152
See application file for complete search history.

(56) References Cited

U.S. PATENT DOCUMENTS

| | | | | |
|---|---|---|---|---|
| 1,630,313 A | * | 5/1927 | Rorabeck | 474/162 |
| 2,721,485 A | * | 10/1955 | Bombardier | 474/161 |
| 2,824,458 A | * | 2/1958 | Barland et al. | 474/162 |
| 3,168,836 A | * | 2/1965 | Militana | 474/152 |
| 3,469,468 A | * | 9/1969 | Cozzarin et al. | 474/161 |
| 3,550,465 A | * | 12/1970 | Maeda | 474/151 |
| 3,752,035 A | * | 8/1973 | Cozzy et al. | 89/13.05 |
| 4,078,445 A | * | 3/1978 | Kiser, Jr. | 474/150 |

(Continued)

FOREIGN PATENT DOCUMENTS

| CN | 201 103 662 Y | 8/2008 |
|---|---|---|
| DE | 202 18 755 U1 | 2/2003 |
| FR | 572 312 A | 6/1924 |

OTHER PUBLICATIONS

International Search Report, Nov. 11, 2011, from International Phase of the instant application.

*Primary Examiner* — Henry Liu
(74) *Attorney, Agent, or Firm* — Jackson Patent Law Office

(57) ABSTRACT

The invention relates to a multipart sprocket (1), in which an inner ring (2) for fixing the multipart sprocket (1) to a wheel hub comprises through-holes (5) which are located on a common hole circle, wherein the inner ring (2) on the periphery thereof comprises radially outwardly directed inner ring lugs (2A) for receiving a gear rim (8), and the gear rim (8) comprises radially inwardly directed gear rim lugs (11) which are spatially associated with the radially outwardly directed inner ring lugs (2A), and means (12, 13, 14) are present, which connect the inner ring (2) and the gear rim (8) axially and radially.

11 Claims, 9 Drawing Sheets

(56) References Cited

U.S. PATENT DOCUMENTS

| | | | |
|---|---|---|---|
| 4,144,773 A * | 3/1979 | Addicks | 474/161 |
| D266,558 S * | 10/1982 | Breen et al. | D12/123 |
| 4,589,860 A * | 5/1986 | Brandenstein et al. | 474/161 |
| 4,594,910 A * | 6/1986 | Nagano | 74/594.2 |
| 4,608,878 A * | 9/1986 | Shimano | 74/594.2 |
| 4,867,733 A * | 9/1989 | Yamanoi et al. | 474/161 |
| 5,644,953 A * | 7/1997 | Leng | 74/594.2 |
| 5,865,699 A * | 2/1999 | Leini | 474/161 |
| 5,893,299 A * | 4/1999 | Yamanaka | 74/594.2 |
| 6,014,808 A * | 1/2000 | Santi | 29/893.37 |
| 6,024,662 A * | 2/2000 | Fujimoto | 474/144 |
| 6,361,461 B1* | 3/2002 | Pusic | 474/152 |
| 7,481,729 B2* | 1/2009 | Andel | 474/162 |
| 7,585,240 B2* | 9/2009 | Kamada | 474/160 |
| 7,824,287 B2* | 11/2010 | Nonoshita et al. | 474/161 |
| 7,850,564 B2* | 12/2010 | Nonoshita | 474/161 |
| 7,871,347 B2* | 1/2011 | Kamada | 474/160 |
| 7,967,709 B2* | 6/2011 | Emura et al. | 474/161 |
| 8,574,108 B2* | 11/2013 | Wang | 474/152 |
| 2002/0086753 A1* | 7/2002 | Yahata | 474/160 |
| 2003/0199351 A1* | 10/2003 | Nichols | 474/160 |
| 2004/0092352 A1* | 5/2004 | Chiang | 474/160 |
| 2004/0110590 A1* | 6/2004 | Renshaw | 474/152 |
| 2004/0259674 A1* | 12/2004 | Pfister | 474/152 |
| 2005/0233850 A1* | 10/2005 | Andel | 474/152 |
| 2005/0282671 A1* | 12/2005 | Emura et al. | 474/160 |
| 2007/0161443 A1* | 7/2007 | Krisl | 474/95 |
| 2007/0173364 A1* | 7/2007 | Renshaw | 474/160 |
| 2011/0053721 A1* | 3/2011 | Kamada | 474/160 |
| 2011/0312457 A1* | 12/2011 | Wang | 474/152 |
| 2013/0116074 A1* | 5/2013 | Lin | 474/152 |

* cited by examiner

SPROCKET

The present invention relates to a sprocket for transferring torque in a gear, whose peripheral gearing interacts in a form-fitting manner with a traction means, in particular for motorcycles.

The field of application of the present invention extends especially to traction drives. In this case, power transmission takes place by at least one gear/traction means pairing. A bolt chain or the like preferably can be used as the traction means.

U.S. Pat. No. 3,225,616 discloses a gear, in which a plurality of overlapping gear lugs are fastened to a flange of a support wheel by means of pins and screws.

A sprocket, which is composed of a middle part made of a light metal alloy, to which a gear rim made of an iron alloy is joined by rivets, is shown and described in DE 60305206 T2. For this purpose, the gear rim made of the iron alloy has radial lugs that correspond to pocket-like recesses in the middle part and overlap crosswise with these over the bottom of the pocket-like recesses.

It is a disadvantage in these types of systems that relatively high construction and manufacturing costs are necessary for the formation and production of a gear. Pocket-like recesses can only be produced with so-called 3-D manufacturing techniques. In addition, the joining to the support part for the most part is not suitable for transmission of high torque under unfavorable conditions. Unfavorable conditions will be understood here, for example, as motocross rides, thus rides in rough terrain and particularly in sand and mud.

The object of the present invention is thus to create a sprocket for the transmission of torque, which sprocket can be produced with manufacturing costs that are as low as possible despite high requirements for strength, robustness and esthetic effect, whereby many possible design variations will be indicated.

This object is achieved by sprockets with the features of claims 1 and 5. Advantageous embodiments can be found in the dependent claims.

The advantages of the sprockets according to the invention lie in the simple two-dimensional (2-D) manufacture of their individual parts and in the good exchangeability of their worn-out components, as well as in the versatility of possible designs.

For example, a multipart sprocket for transmitting torque in a gear, whose peripheral gearing interacts with a traction means in a form-fitting manner, wherein an inner ring has through-holes that lie on a common hole circle for fastening the multipart sprocket to a wheel hub, wherein an inner ring has inner ring lugs that are directed radially outwardly for receiving a gear rim on its periphery, and that the gear rim has gear rim lugs directed inwardly that are spatially associated with the radially outwardly directed inner ring lugs of the inner ring, and that means that connect the inner ring and the gear rim axially and radially with one another are present.

Particularly advantageous is a sprocket with an inner ring that has openings for receiving a gear rim on its periphery, these openings being opened radially outwardly and in which the gear rim has lugs directed radially inwardly, corresponding in form-fitting manner to the radially outwardly opened openings of the inner ring.

Further, a multipart sprocket is of advantage if the gear rim/gear-rim lugs have openings directed radially inwardly, corresponding in form-fitting manner to the radially outwardly directed inner ring lugs of the inner ring.

In addition, a multipart sprocket is advantageous if the inner ring can receive gear rims with different diameters and correspondingly different numbers of teeth, the gear-rim lugs directed radially inwardly varying in their inwardly directed dimensions, dependent on the diameter of the respective gear rim.

Over and above this, a multipart sprocket is advantageous if the inner ring is designed in a weight-reduced skeletal construction with optimized strength.

In addition, a multipart sprocket is of advantage, if the composite structure of inner ring and gear rim, in addition to form-fitting, is produced via special conical depressions in combination with fitted bolts.

A multipart sprocket is then also advantageous if the inner ring and the gear rim are composed of different materials and if the inner ring and the gear rim have a coloring that is different.

A multipart sprocket can then be produced in a particularly advantageous way if the production of inner ring and gear rim is carried out exclusively by a 2-D manufacturing method.

In addition, a multipart sprocket is advantageous if the inner ring and the gear rim thereof have different material thicknesses.

For specific application conditions, it is advantageous in the case of a multipart sprocket, if the gear rim has a discontinuous sequence of teeth.

Particularly advantageous is a sprocket with a peripheral gearing that interacts in form-fitting manner with a chain that has a given period of chain division P, and in which a number of teeth is present at the periphery of the sprocket, and through-holes are present for fastening the sprocket to a wheel hub, these holes lying on a common hole circle, if the number of teeth is reduced in comparison to the number of teeth given by the chain-division period P.

A sprocket is extraordinarily advantageous if the distance between the teeth corresponds to double the chain-division period 2P of the chain division P.

Further, a sprocket is of advantage, if it is composed of an inner ring and an exchangeable gear rim.

In addition, a multipart sprocket is advantageous, if at least one gear rim region of the sprocket is formed by a package of parallel layers made of different materials, the thickness thereof representing the tooth width of the gear rim region, the middle layer of the package being composed of a material with high strength, and the adjacent layers being formed of materials of lower strength.

A multipart sprocket is particularly advantageous if the entire sprocket is formed by a package of several parallel layers.

Further, it is of advantage in a multipart sprocket, if the middle layer of the package is composed of a steel alloy with high strength and the adjacent layers are formed of plastics of lower strength.

Relative to being subject to wear and for esthetic aspects, in the case of a multipart sprocket, it is desirable if the plastic layers adjacent to the middle layer of the package have a coloring that is different from the middle layer.

The invention will be explained in more detail below with the help of exemplary embodiments, based on the drawings. Here:

Figure 1:
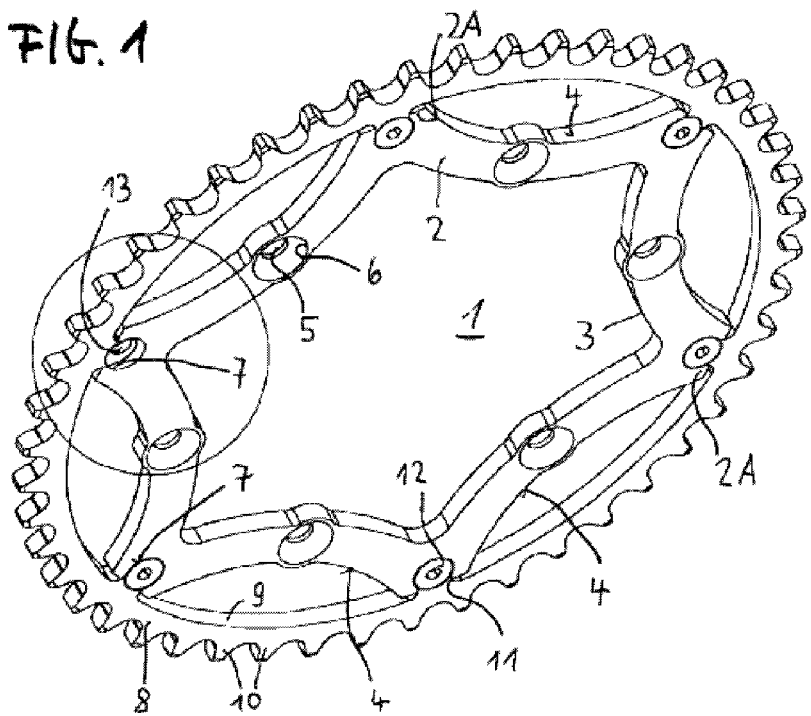
FIG. 1 shows a spatial view of a sprocket according to the invention.

In FIG. 1, a sprocket 1 according to the invention that is essentially composed of two main components is illustrated. The first component is formed by an inner ring 2 that has a contour that is derived from a skeletal hexagon, so that a ring frame 3 with six concave sides 4 is formed. In the center of each of the concave sides 4 is found a borehole 5 that runs out in a depression 6. The inner ring 2 is fastened to a wheel hub (not shown) by means of these six boreholes 5—which lie on a common hole circle. Inner ring lugs 2A with openings 7, which are opened radially outwardly, are found at the six corners of the ring frame 3 forming the inner ring 2. The second component is formed by a gear rim 8, whose contour is derived from a circular ring 9. A gearing with a specific number of teeth 10 distributed uniformly over the periphery is found at the periphery thereof. In its inner contour, the gear rim 8 has gear-rim lugs 11, which are directed radially inwardly. The geometric distribution and the number of radially inwardly directed gear-rim lugs 11 correspond to the geometric arrangement and number of the inner ring lugs 2A with their openings 7 at the corners of the ring frame 3. The gear-rim lugs 11 directed radially inwardly and the openings 7 at the inner ring lugs 2A are fine-tuned to one another, so that they correspond.

In one assembly of the sprocket 1, the gear rim 8 can be mounted at the inner ring lugs 2A by means of the radially inwardly directed gear-rim lugs 11 on the inner ring 2 with its outwardly opened openings 7, so that in the final position, the inner ring 2 and the gear rim 8 lie in one plane and together form a sprocket 1 ready for operation. Inner ring 2 and gear rim 8 are mechanically secured and adjusted, if necessary, with the help of fitted bolts 12, which are fitted precisely on boreholes 13, which are found in the gear-rim lugs 11.

Figure 2:
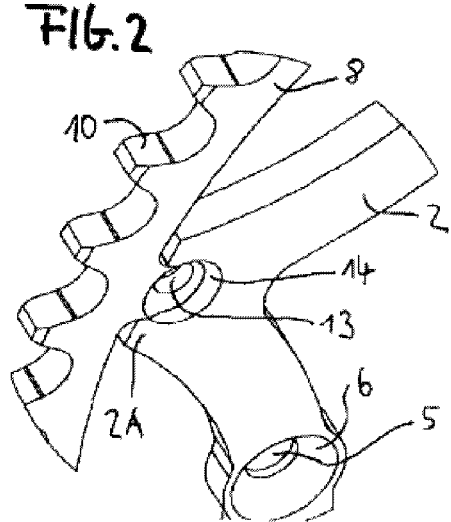
FIG. 2 shows an enlarged detail view of a joining between inner ring and gear rim according to FIG. 1.

A detail that clearly shows the arrangement of gear rim lug 11 inside the opening 7 and the borehole 13 is shown greatly enlarged in FIG. 2. For the above-mentioned adjustment, a depression 14 is present, in which the fitted bolt 12 shown schematically in FIG. 1 engages by the cone thereof (not shown).

Figure 3:
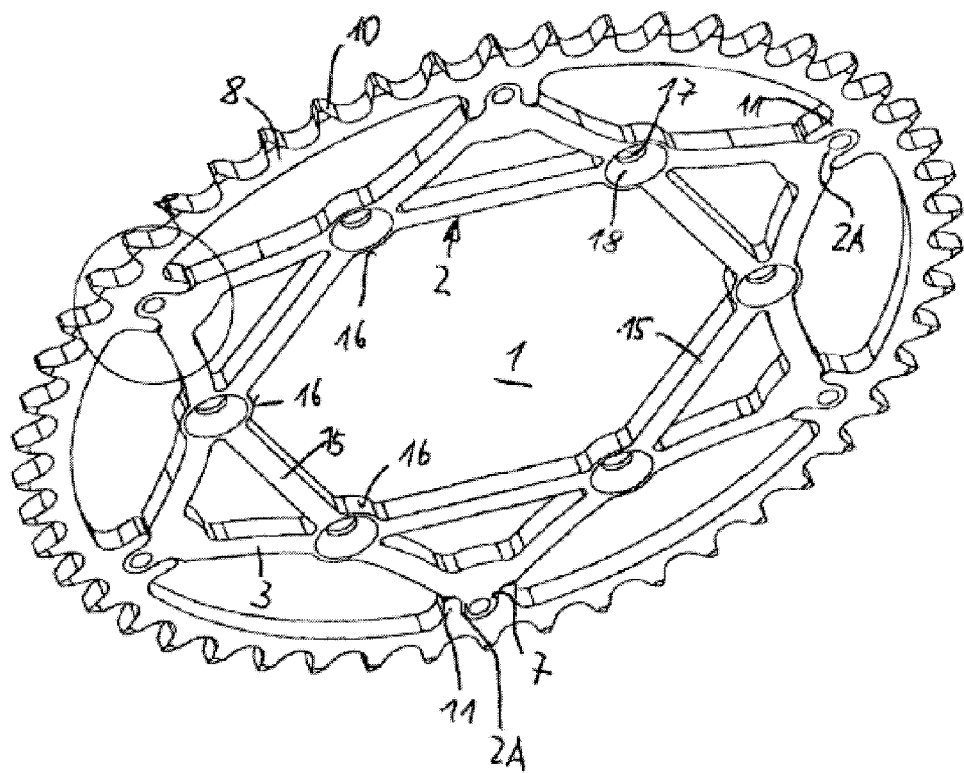
FIG. 3 shows a variant of a sprocket according to the invention in a spatial view.

FIG. 3 shows a variant of the sprocket 1 according to the invention. In a similar way—as shown on the example of embodiment of FIG. 1—an inner ring 2 is present, which, for weight reasons, is resolved in a contour that forms a ring frame 3 and is similar to a hexagon. In order to obtain a weight that is as low as possible, in this exemplary embodiment, the ring frame 3 is designed with particularly small frame thickness. The necessary high strength of the inner ring 2 is obtained by an accessory ring frame 15, which is rotated by 60° relative to ring frame 3, and forms a nodal point 16 with each of the sides of the ring frame 3 in the center thereof. In each of nodal points 16 is found a borehole 17 with depression 18, with the help of which the inner ring 2 can be fixed on a wheel hub (not shown).

Deviating from the example of embodiment according to FIG. 1, the inner ring 2 in this example of embodiment supports inner ring lugs 2A directed radially outwardly, these lugs corresponding to openings 7 in gear-rim lugs 11 directed inwardly in gear rim 8. This structural form can be advantageous when a greater number of teeth should be selected with a larger diameter of the gear rim 8. Since the functional significance does not change, however, due to the change in the order of lugs 2A/11 and openings 7 for inner ring 2 and gear rim 8, the same reference numbers are used analogously for the concerned components.

Figure 4:
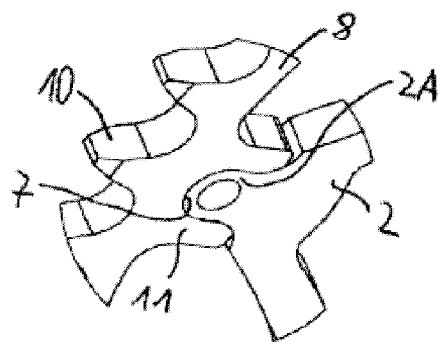
FIG. 4 shows an enlarged detail view of a joining between inner ring and gear rim according to FIG. 3.

A corresponding detail is shown in an enlarged excerpt in FIG. 4, which speaks for itself.

Figure 5:
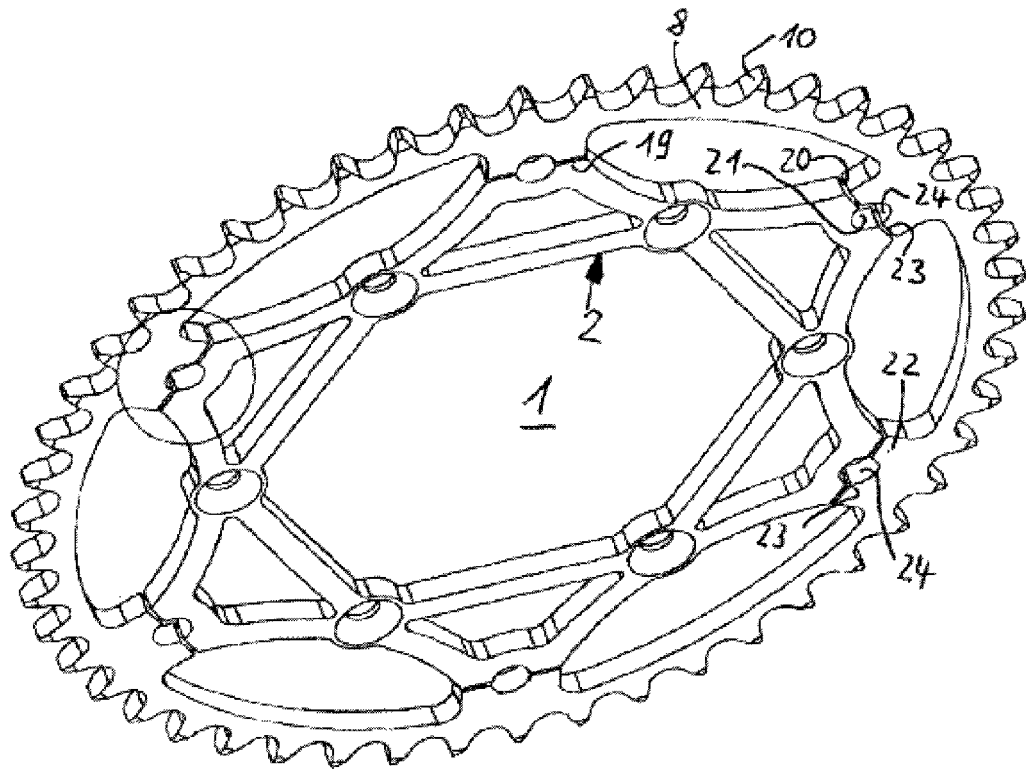
FIG. 5 shows another variant of a sprocket according to the invention in a spatial view.

An example of embodiment is shown in FIG. 5, in which the inner ring 2 is configured similarly to the example of embodiment according to FIG. 3, so that reference can be made thereto. Of course, the fastening elements between inner ring 2 and gear rim 8 have considerable differences in comparison to the exemplary embodiments already depicted. At its six corners, the inner ring 2 is greatly flattened radially, so that six inner ring lugs 19 with radially outward directed surfaces 20 result. Axially aligned openings 21 are incorporated in the surfaces 20. A gear rim 8 has gear-rim lugs 22 directed radially inward, which terminate in surfaces 23 directed radially inward. Axially aligned openings 24 are also incorporated in the surfaces 23. When inner ring 2 and gear rim 8 are assembled, the surfaces 20 and 23 of the inner ring lugs 19 and the gear-rim lugs 22 are parallel opposite one another. Due to the axially aligned openings 21 and 24, in each case a through-borehole 21/24 is produced, in which fastening means such as screws, rivets or the like can be arranged for fixing the two sprocket components of inner ring 2 and gear rim 8.

Figure 6:
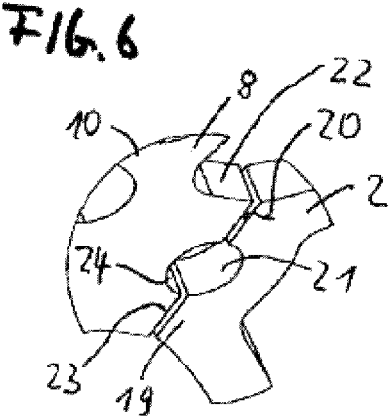
FIG. 6 shows an enlarged detail view of a joining between inner ring and gear rim according to FIG. 5.

A detail with respect to this is shown greatly enlarged in FIG. 6, analogous to the above-described exemplary embodiments.

Figure 7:
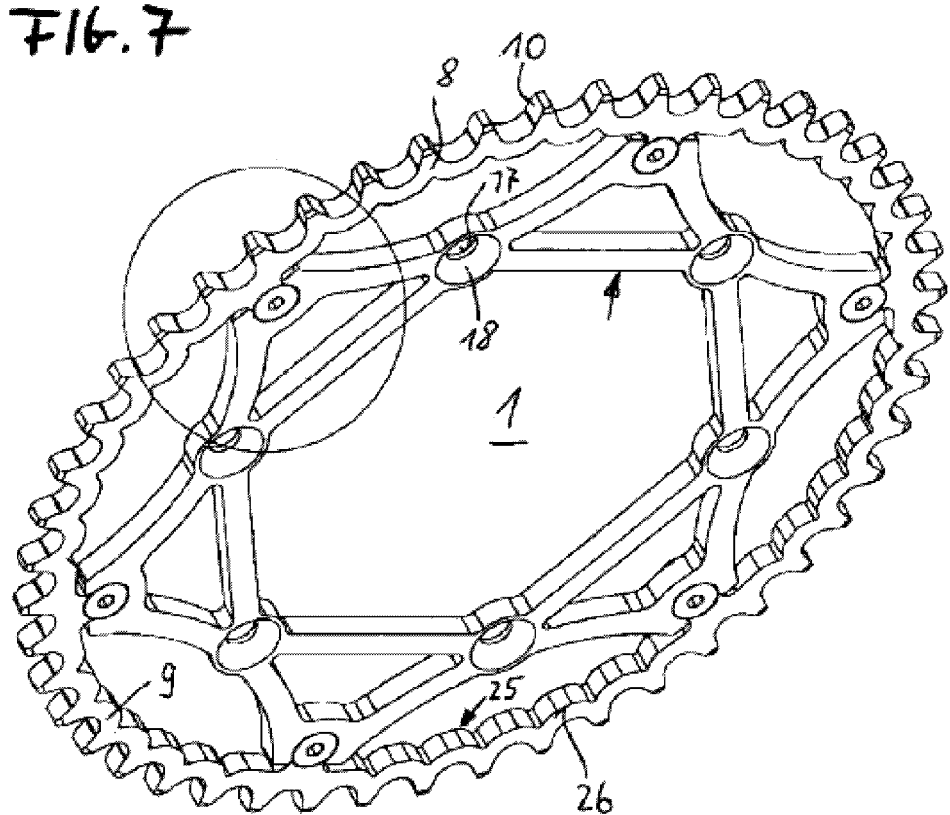
FIG. 7 shows yet another variant of a sprocket according to the invention in a spatial view.

Another example of embodiment is shown in FIG. 7. Here, it can be recognized that the fastening variant according to the example of embodiment of FIG. 1 was combined with the inner ring according to the example of embodiment of FIG. 2, whereby, of course, a further reduction in weight is achieved by the special design of the gear rim 8. In order to avoid repetition, reference is made expressly to the corresponding parts of the figure descriptions for FIGS. 1 to 4. The gear rim 8, however, clearly deviates from the circular ring-shaped contour thereof. The arrangement of the teeth 10 of the gear rim 8 remains unchanged, but the contour of the circular ring 9 is changed so that the inner contour 25 essentially follows the outer shape of the teeth 10. By this measure, the radial material thickness of the gear rim 8 is reduced approximately to the tooth width at the base of the teeth 10 and convex protuberances 26, which approximately follow the course of the respective tooth base, result for the inner contour 25 of the gear rim 8.

Figure 8:
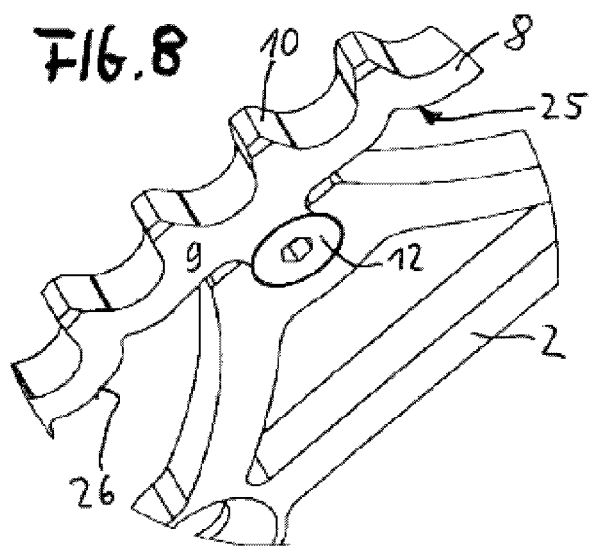
FIG. 8 shows an enlarged detail view of a joining between inner ring and gear rim according to FIG. 7.

A corresponding detail can be taken from FIG. 8—again greatly enlarged.

Figure 9:
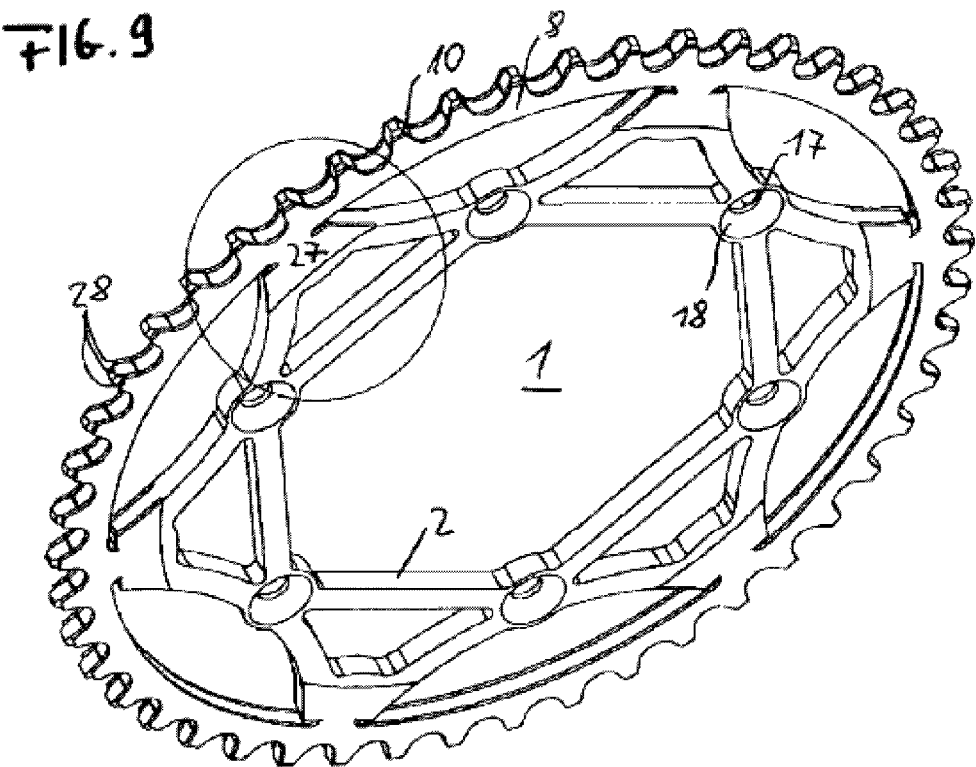
FIG. 9 shows another variant of a sprocket according to the invention in a spatial view.

An additional variant of a sprocket 1 is shown in FIG. 9. In this example of embodiment, in region 27 of the gear rim 8, the sprocket 1 is composed of a package 28 of parallel layers 29, 30, 31 of different materials, whose thickness represents the tooth width of the gear rim region 27, the middle layer 30 of the package 28 being composed of a material with high strength, and the adjacent layers 29, 31 being formed of materials of lower strength. The joining of inner ring 2 and gear rim 8 in this case can proceed in a manner as has already been described and shown.

Figure 10:
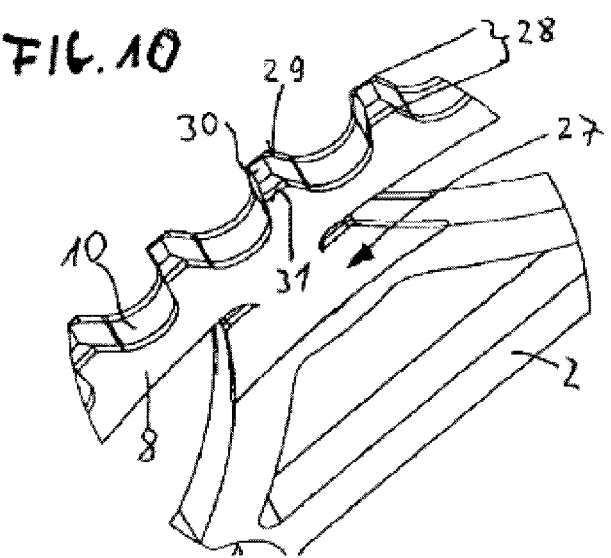
FIG. 10 shows an enlarged detail view of an embodiment of a gear rim according to FIG. 9.

This variant is illustrated in detail in FIG. 10. Such an embodiment favors the wear behavior of the sprocket 1, since the materials of the layer package 28 that are less resistant to wear protect the chain during engagement. A positive esthetic effect is a further advantage in selling this multi-colored sprocket.

Figure 11:
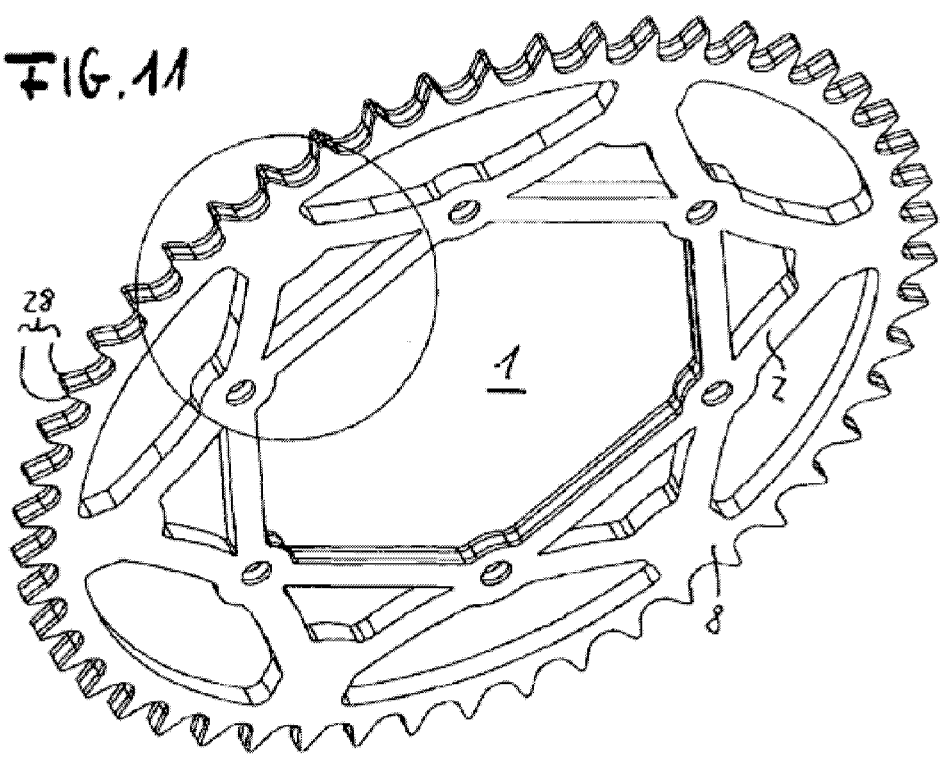
FIG. 11 shows yet another variant of a sprocket according to the invention in a spatial view.

FIG. 11 shows a particularly advantageous variant, in which finally the entire sprocket 1 is composed of a multilayer package 28. The inner ring 2 and the gear rim 8 are almost completely formed from a package of three layers 29, 30, 31. The two outer layers 29 and 31 are composed of material with a lower strength, preferably plastic. The inner layer 30 is composed of a material with higher strength, preferably steel, at least in the region of the gear rim 8. The two outer layers 29 and 31 can be shaped by extrusion coating the inner layer 30 so that the inner layer 30 is ensheathed by the outer layers 29 and 31 in such a way that only the region of the gear rim 8 at which the sprocket 1 has contact with the chain remains free of the sheathing.

A practical solution to the production of such an ensheathed sprocket 1 can be found in that the inner layer 30, composed of inner ring 2 and gear rim 8 are placed in a mold, and the surrounding layers 29 and 31 are introduced around the inner layer 30 in a spraying process. For this purpose, both plastics as well as light metals are suitable, for example. The composite formed of the three layers 29, 30 and 31 takes care of the joining of inner ring 2 and gear rim 8, introducing still further manufacturing and optical advantages.

Figure 12:
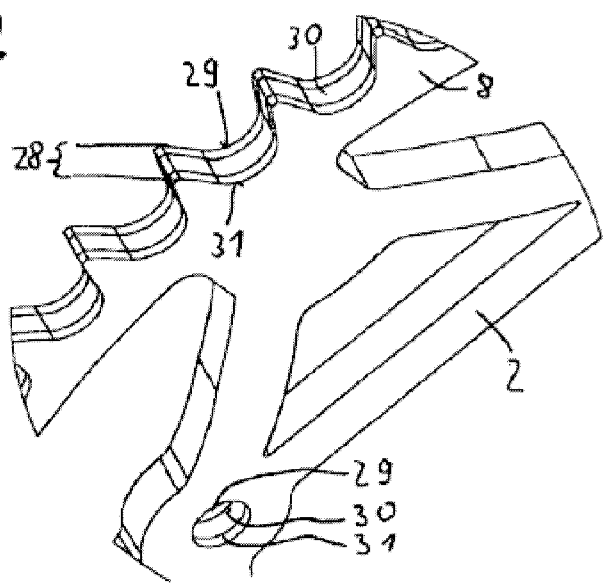
FIG. 12 shows an enlarged detail view of an embodiment of a gear rim according to FIG. 11.

Analogous to the above-described exemplary embodiments, a greatly enlarged detail of this advantageous structural form is shown in FIG. 12. Identical or functionally identical elements are also given the same reference numbers here, just as in the previous Examples.

Figure 13:
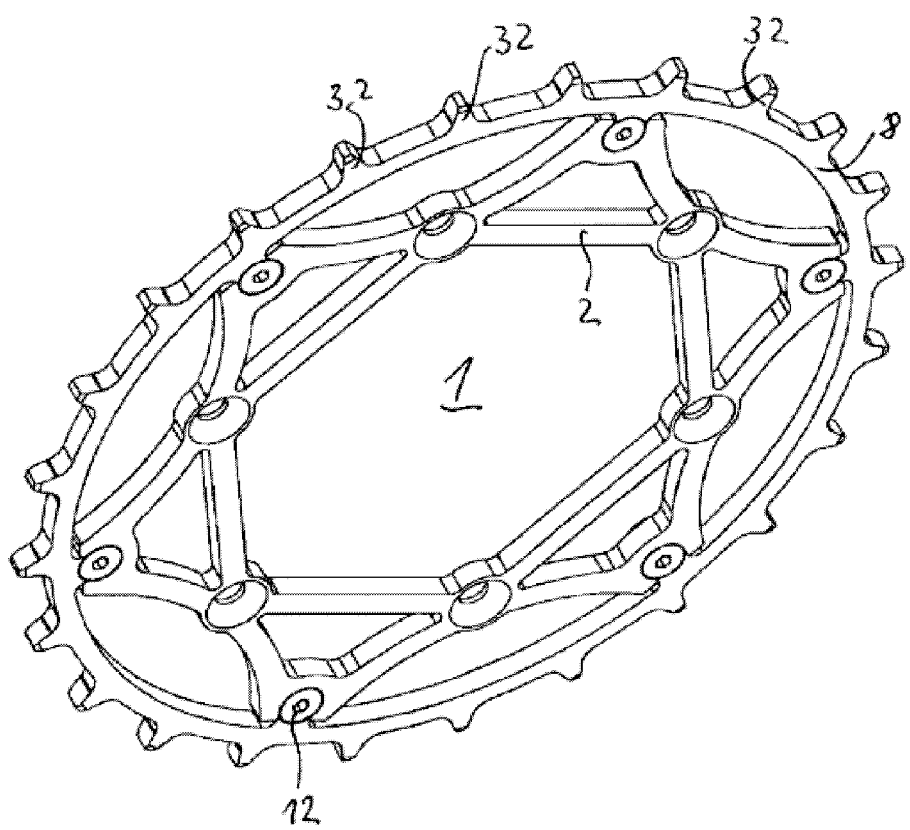
FIG. 13 shows another embodiment of a gear rim with reduced number of teeth in spatial view of a sprocket.

FIG. 13 shows yet another variation of a sprocket 1 according to the invention. For the given diameter of the gear rim 8, clearly fewer teeth 32 are disposed on the periphery thereof. This measure—in addition to sufficient strength for the torque transmission—causes a clear improvement of the self-cleaning of the sprocket 1 together with the chain (not shown). This effect is of very great advantage, particularly for dirt bikes (motocross). Friction losses due to sand, mud and similar contaminants are also considerably reduced in comparison to a sprocket 1 with traditional number of teeth. In competitions, this represents a clear performance edge.

Figure 14:
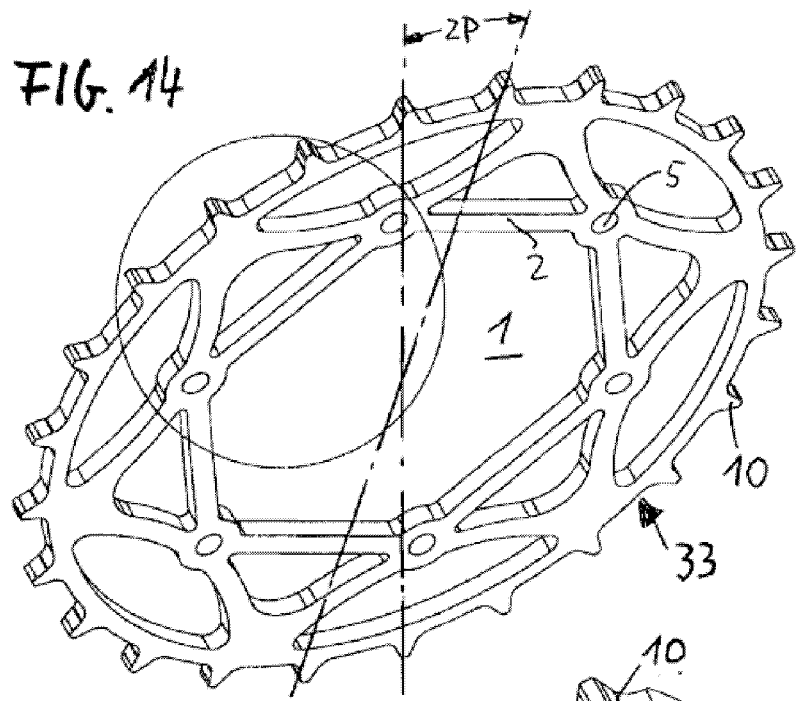
FIG. 14 shows a variant of a sprocket with reduced number of teeth.

A sprocket 1 shown in FIG. 14 is composed of an inner ring 2, which bears a number of teeth 10 on its periphery 33. On a common hole circle in the inner ring 2 are found boreholes 5, which serve for the fastening of the sprocket 1 to a hub (not shown). The hub is a component of a drive wheel of a motorcycle, which also does not need to be shown in order to explain the invention.

The teeth 10 of the sprocket 1 are disposed at a distance from one another, which is derived from a specific chain division period P. The chain division period P is determined by the division of a link chain (not shown). In the prior art, the number of teeth of a sprocket is determined by the corresponding chain division period P in such a way that the individual chain links each engage with a tooth of a sprocket in the looping of the sprocket.

In the depicted example of embodiment of a gear 1 according to the invention, the distance between two adjacent teeth 10, of course, amounts to two chain division periods 2P. Accordingly, a tooth is missing between two adjacent teeth 10, so that a gap is formed, which is double the size in a conventional sprocket for a link or bolt chain having a specific division.

This measure is based on the knowledge that in riding a dirt bike in mud, this mud—and other contaminants also, of course—penetrates between the teeth 10 of the sprocket 1 and the links of the bolt chain and considerably impairs the power transmission. This leads to high friction losses, to reductions in the direct contact between sprocket 1 and bolt chain, in fact to extensions of the bolt chain, which in turn lead to over-extension and damage, at the very least to premature wear of sprocket and bolt chain.

Due to the increase in the distance between two adjacent teeth 10 according to the invention, the contaminants and the mud are removed in a considerably better way, and there is a certain self-cleaning effect. It has been shown in tests that the necessary strength for the power transmission is completely assured, in addition, despite the absence of a tooth each time. An increase of the distance between two adjacent teeth to more than two chain division periods is also conceivable. The size selected for the tooth gap is aligned toward the periphery of the sprocket, the division period of the bolt chain and to a certain extent also toward the power to be transmitted. Further, the additional weight reduction is also advantageous.

Figure 15:
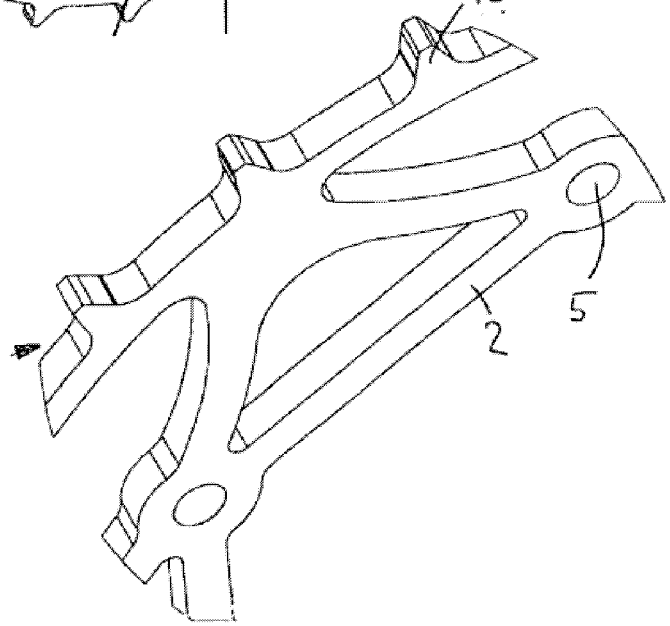
FIG. 15 shows an enlarged detail view of an embodiment of a gear rim according to FIG. 14.

A detail of a sprocket 1 according to FIG. 14 is shown enlarged in FIG. 15, wherein identical or functionally identical elements are provided with the same reference numbers—as also for the figure descriptions of the other embodiment examples.

Figure 16:
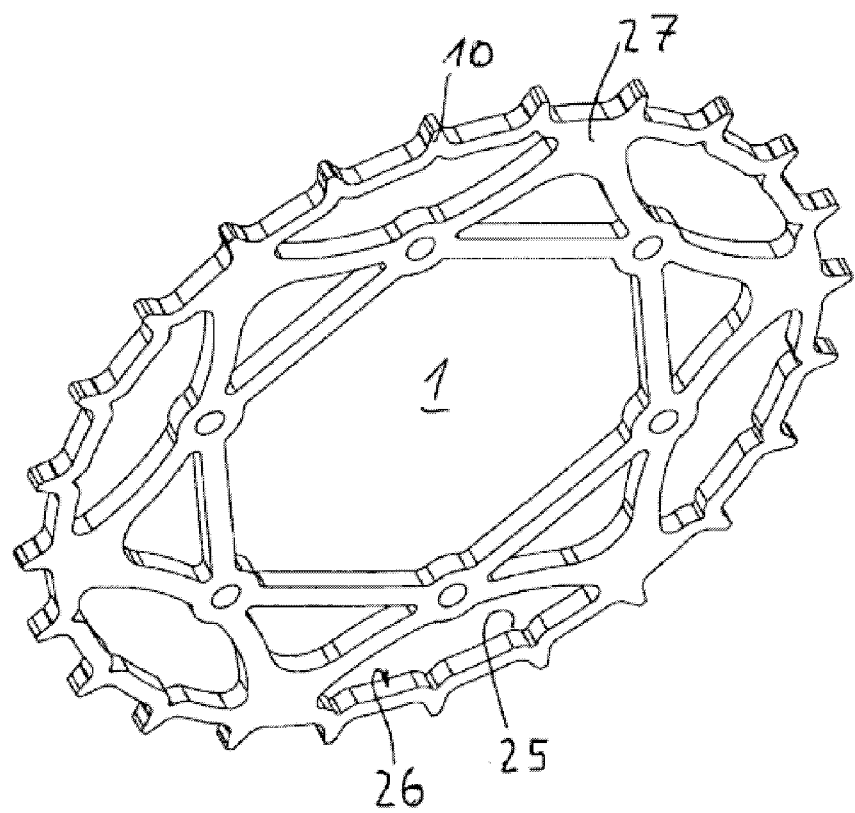
FIG. 16 shows a weight-reduced variant of a sprocket with reduced number of teeth.

Another example of embodiment is shown in FIG. 16, whereby, of course, a further reduction in weight is achieved by the special design of the gear rim region 27. In order to avoid repetition, reference is made expressly to the corresponding parts of the figure descriptions for the preceding figures. The gear rim region 27, however, clearly deviates from the circular ring-shaped contour thereof. The arrangement of the teeth 10 of the gear rim region 27 remains unchanged when compared with the previous exemplary embodiments, but the contour of the circular ring is changed in that the inner contour 25 of the gear rim 14 essentially follows the outer shape of the teeth 10. By this measure, the radial material thickness of the gear rim region 27 is reduced approximately to the tooth width at the base of the teeth 10 and flattened convex protuberances 26, which approximately follow the course of the respective tooth base, result for the inner contour 25 of the gear rim region 27. The reduction in the number of teeth 10, and the reduction in the mass of the gear rim region 27 advantageously reduce the mass of the sprocket 1, so that the weight is again more favorable.

The double tooth gaps shown in the exemplary embodiments in any case shall not limit the invention to this dimensional data.

A very special advantage of a sprocket 1 according to the invention—whatever the proposed structural shape—is found in the fact that the variants, insofar as the cutting region is concerned, can be manufactured exclusively with machine tools that operate in so-called 2-D methods. This introduces very great cost advantages during production when compared with 3-D manufacture, as is necessary, for example, for so-called pocket milling and the like, in the case of sprockets according to the prior art.

In the variants shown, the inner part of the sprocket may be composed completely of plastic or of a light metal. The exchangeability of the gear rim has both maintenance as well as economical end ecological advantages, since when the gear rim is worn out, only the gear rim needs to be changed and not the entire sprocket.

LIST OF REFERENCE CHARACTERS

1 Sprocket
2 Inner ring
2A Inner ring lugs
3 Ring frame
4 Concave sides
5 Borehole
6 Depression
7 Openings
8 Gear rim
9 Circular ring
10 Teeth
11 Gear-rim lugs
12 Fitted bolt
13 Borehole
14 Depression
15 Accessory ring frame
16 Nodal point
17 Borehole
18 Depression
19 Inner ring lugs
20 Surfaces
21 Openings
22 Gear-rim lugs
23 Surfaces
24 Openings
25 Inner contour
26 Convex protuberances
27 Gear rim region
28 Package of parallel layers
29 Layer
30 Layer
31 Layer
32 Teeth
33 Periphery

The invention claimed is:

1. A multipart sprocket for transmitting torque in a gear, in which a gear rim interacts via its peripheral gearing in form-fitting manner with a chain that has a given chain division period, and in which an inner ring for fastening the multipart sprocket to a wheel hub has through-holes that lie on a common hole circle, hereby characterized in that the inner ring defines a polygon that is formed by a ring-frame, an inner perimeter of the polygon delimiting a contiguous void, the contiguous void surrounding a rotation axis of the sprocket, and has means for fastening a gear rim having largely circular ring-shaped contour.

2. The multipart sprocket according to claim 1, further characterized in that the means for fastening are formed by inner ring lugs, which have openings that are opened radially outwardly and correspond in form-fitting manner to gear-rim lugs directed radially inwardly.

3. An assembly comprising:
   a chain defining a chain division period; and
   the multipart sprocket according to claim 1, further including a plurality of teeth, a distance between teeth being greater than the chain division period.

4. The assembly according to claim 3, further characterized in that the distance between teeth corresponds to double the chain division period.

5. The multipart sprocket according to claim 1, further characterized in that the inner ring and the gear rim are made of different materials.

6. The multipart sprocket according to claim 1, further characterized in that the inner ring and the gear rim have different material thicknesses.

7. The multipart sprocket according to claim 1, wherein the gear rim is formed by
   a first layer composed of a material having a first strength, the first layer forming a top land of a tooth of the gear rim;
   a second layer parallel to and adjacent the first layer, the second layer composed of a material having a strength lower than the first strength; and
   a third layer parallel to and adjacent the first layer, the third layer composed of a material having a strength lower than the first strength,
   wherein a composite thickness of the first, second, and third layers represents a tooth width.

8. The multipart sprocket according to claim 7, wherein the first layer is made of a steel alloy and the second and third layers are made of plastics.

9. A multipart sprocket for transmitting torque in a gear, in which a gear rim interacts via its peripheral gearing in form-fitting manner with a chain that has a given chain division period, and in which an inner ring for fastening the multipart sprocket to a wheel hub has through-holes that lie on a common hole circle, hereby characterized in that the inner ring is composed of a polygon skeleton that is formed by a ring-frame, and has means for fastening a gear rim having largely circular ring-shaped contour, wherein the means for fastening are formed by gear-rim lugs, which have radially inwardly directed openings, which correspond in form-fitting manner to radially outwardly directed inner ring lugs of inner ring.

10. A multipart sprocket for transmitting torque in a gear, in which a gear rim interacts via its peripheral gearing in form-fitting manner with a chain that has a given chain division period, and in which an inner ring for fastening the multipart sprocket to a wheel hub has through-holes that lie on a common hole circle, hereby characterized in that the inner ring is composed of a polygon skeleton that is formed by a ring-frame, and has means for fastening a gear rim having largely circular ring-shaped contour, wherein a gear rim region of the sprocket is formed by a package of parallel layers of different materials, whose thickness represents the tooth width of the gear rim region, the middle layer of the package being composed of a material with high strength, and the adjacent layers being formed of materials of lower strength, and the means for joining inner ring and gear rim are formed by the interaction of the package in a composite of parallel layers.

11. A multipart sprocket for transmitting torque in a gear, in which a gear rim interacts via its peripheral gearing in form-fitting manner with a chain that has a given chain division period, and in which an inner ring for fastening the multipart sprocket to a wheel hub has through-holes that lie on a common hole circle, hereby characterized in that the inner ring is composed of a polygon skeleton that is formed by a ring-frame, and has means for fastening a gear rim having largely circular ring-shaped contour, wherein a gear rim region of the sprocket is formed by a package of parallel layers of different materials, whose thickness represents the tooth width of the gear rim region, the middle layer of the package being composed of a material with high strength, and the adjacent layers being formed of materials of lower strength, and the middle layer of the package is made of a high-strength steel alloy, and the adjacent layers are formed of low-strength light metal.

* * * * *